March 11, 1969 B. CHIN 3,432,756

CONTINUOUS MICROWAVE ATTENUATOR

Filed Nov. 2, 1966

INVENTOR,
Ball Chin

BY: Harry M. Saragovitz,
Edward J. Kelly & Herbert Berl ATTORNEYS.

United States Patent Office 3,432,756
Patented Mar. 11, 1969

3,432,756
CONTINUOUS MICROWAVE ATTENUATOR

Ball Chin, El Paso, Tex., assignor to the United States of America as represented by the Secretary of the Army Filed Nov. 2, 1966, Ser. No. 591,659
U.S. Cl. 325—300 2 Claims
Int. Cl. H04b *1/06, 1/16;* H01p *1/22*

ABSTRACT OF THE DISCLOSURE

A continuous microwave attenuator, employing a microwave circulator, which extends the dynamic range of microwave receivers, provides a continuous attenuated signal output, and preserves the characteristics of amplitude modulated signals after the signals have been attenuated to a desired level.

The invention described herein may be manufactured and used by or for the Government, for governmental purposes, without the payment to me of any royalty thereon.

This invention pertains generally to microwave attenuators and more particularly to continuous microwave attenuators employing microwave circulators.

In conventional switching attenuators the attenuation switching means employed such as electromagnetic switching means cause a momentary break in signal continuity between the input and output terminals and, in addition, in some instances where diode limiting means are employed, a clipping of the signal results.

An object of the invention is a continuous microwave attenuator which extends the dynamic range of microwave receivers with little degradation of the receiver minimum detectable signal level or noise figure of the receiving system.

Another object of the invention is a continuous microwave attenuator providing a continuous, uninterrupted, attenuated signal output.

Another object of the invention is a continuous microwave attenuator which preserves the input signal phase information for frequency modulated and phase modulated signals.

A further object of the invention is a continuous microwave attenuator which preserves the characteristics of amplitude modulated signals after the signals have been attenuated to the desired level.

A still further object of the invention is a continuous microwave attenuator for extending the dynamic range of any receiving system and which is compatible with radars, tracking antennas or microwave relay systems where wide dynamic range and a low noise figure are required.

The invention will be more fully understood and its objects and advantages further appreciated by referring now to the following detailed description taken in conjunction with the accompanying drawings in which.

Figures 1, 2, 3, 4:
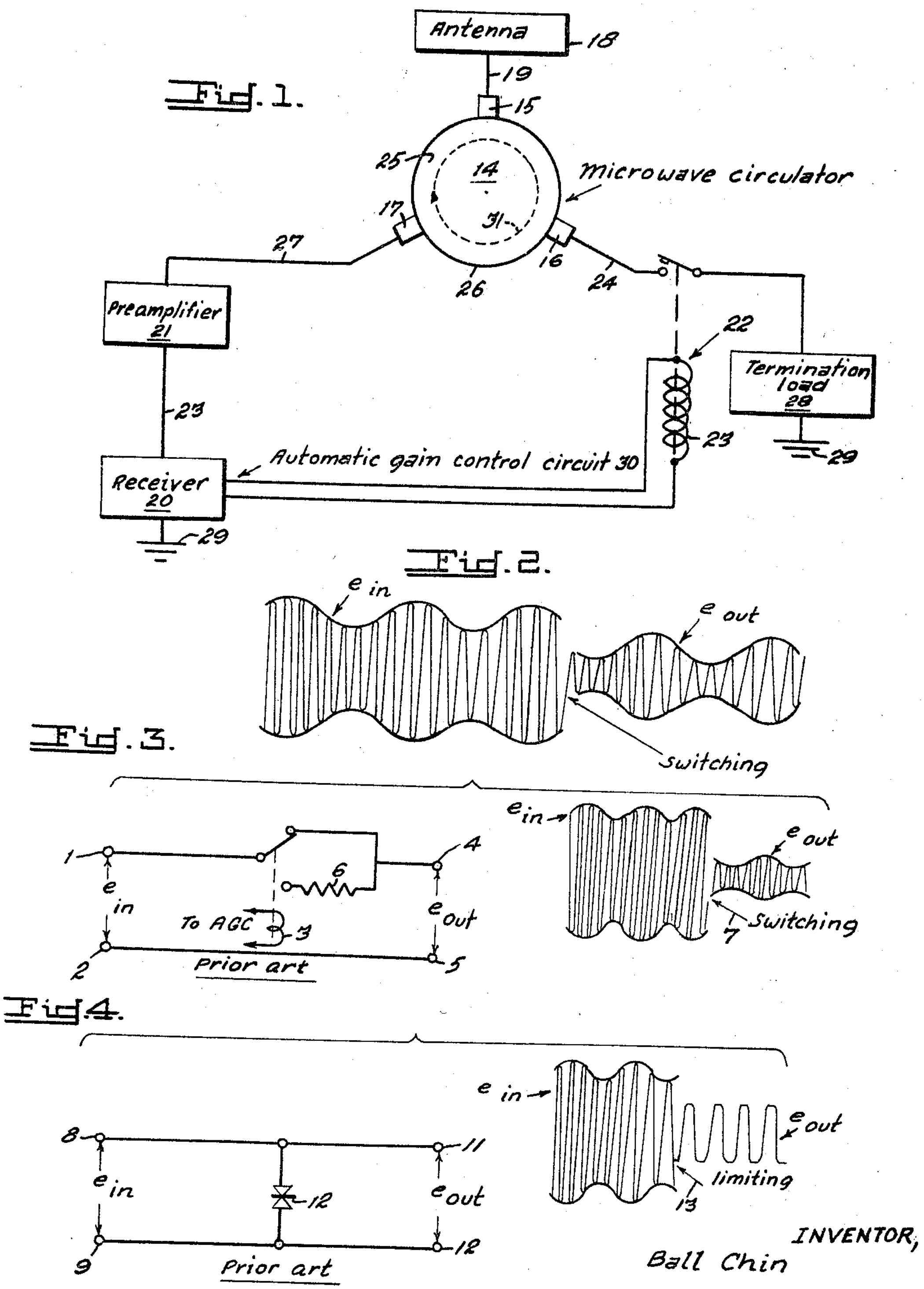
FIGURE 1 is a schematic representation of the continuous microwave attenuator of the invention, including signal source means and receiver means.
FIGURE 2 is a graphical representation of a microwave signal before and after attenuation by the microwave attenuator of the invention.
FIGURE 3 illustrates a prior art switchable attenuator, including graphical representation of a microwave signal before and after attenuation by such an attenuator.
FIGURE 4 illustrates another prior art diode type limiting attenuator, including graphical representation of a microwave signal before and after attenuation by such a device.

In FIGURE 3 there is schematically shown a prior art switchable attenuator having input terminals 1 and 2 to which the input signal identified as $e_{in}$ is applied. A single pole, double throw relay 3 has its switching blade connected to input terminal 1 and has one of its contacts directly connected to output terminal 4 with its other contact connected to output terminal 4 through signal attenuating means 6. A radio frequency receiver, not shown, is coupled to output terminals 4 and 5. The solenoid of the relay is connected in the automatic gain control circuit of said receiver. When the received signal increases to a level where said receiver nears saturation, the automatic gain control circuit of said receiver energizes the relay whereby the attenuation means 6 is placed in series with the input terminal 1 and output terminal 4 causing a discontinuity of the signal as indicated by the arrow 7 in the graphical representation in FIGURE 3. The aforementioned discontinuity of signal is a disadvantage which is overcome by the attenuator of the invention.

In FIGURE 4 another embodiment of prior art attenuators having inherent undesirable features is schematic ally shown. In this emobdiment of diode limiting attenuators, a bipolar voltage limiter 12 is connected in parallel with input terminal 8 and 9, and output terminals 10 and 11. The signal as indicated by $e_{in}$ is applied to the input terminals 8 and 9 and attenuated by the bipolar voltage limiter 12, the attenuated signal being available at output terminals 10 and 11 for coupling to radio receiver means. This means for attenuation also has disadvantages among which is the resultant flat topping of the attenuated signal $e_{out}$ as indicated by the arrow 13 in the graphical representation in FIGURE 4 and which is also not characteristic of the attenuator of the invention.

In FIGURE 1 there is shown a schematic representation of the instant invention employing a microwave circulator 14 which is well known in the art and in general consists of a pair of circular ground plane members, one of which is identified by reference numeral 25, mounted in parallel spaced-apart relationship by means of a peripheral cover or wall 26 which together form the body of microwave circulator 14. Three ports 15, 16 and 17 are symmetrically disposed in cover 26 and may consist of coaxial connectors or when required by certain operations, hollow wave guide connectors. A microwave antenna 18 is coupled to port 15 by means of a coaxial cable 19 for coupling the microwave signals picked up by antenna to port 15. Microwave receiver means including a receiver 20 provided with a preamplifier 21 is coupled through the preamplifier 21 by means of coaxial cable 27 to port 17. A single pole, single throw coaxial relay 22 has its solenoid 23 wired into the automatic gain control circuit of the receiver 20 as generally indicated by reference numeral 30. Port 16 is coupled by means of coaxial cable 24 to one of the contact elements of relay 22. The other contact element of relay 22 is connected directly to one terminal of termination load means 28 which consists of a resistive load having its other terminal connected to a reference point 29 common to the receiver circuits.

In operation, the radio frequency signal picked up by antenna 18 is coupled to port 15 through means of coaxial cable 19 and thereby caused to enter microwave circulator 14. The mode of operation of microwave circulator is selected so that the radio frequency signal flows therein in a clockwise direction as indicated by dotted circle 31. That is, the radio frequency signal flows or culator is selected so that the radio frequency signal flows therein in a clockwise direction as indicated by dotted to port 17 through port 16 is very small when port 16 is open, that is, when the termination load 28 is disconnected from port 16. The signal attenuation from port 15 directly to port 17 is very large because of the unidirectional characteristic of circulator 14. When the input radio frequency signal to port 15 increases to the level where the preamplifier 21 reaches saturation, the automatic gain control circuit of receiver 20 reaches a predetermined level whereby solenoid 23 is enegized causing the contacts of relay 22 to close and connect the termination load 28 to port 16. At this point most of the radio frequency signal from port 15 is absorbed by the termination load 28 with the remaining attenuated radio frequency signal going into port 17 and thus to preamplifier 21. This results in an increases of the receiving system dynamic range with a small increase in system noise figure. By examination of the graphical representation in FIGURE 2 of the input and output signals it can be seen that there is no discontinuity or change in wave form characteristics of the signal at the point in time of switching or during attenuation.

In a practical application of the continuous microwave attenuator of the invention it was found that when port 16 was terminated by a 50 ohm resistive load (termination load 28) with the voltage standing-wave ratio of less than 1.1 to 1.0, the aforesaid attenuator provided an attenuation of 29 db at a predetermined input switching level of minus 52.5 dbm. The input switching level being adjustable to accommodate the receiver automatic gain control output. The demodulated AM signal decreases less than 5 db when the input radio frequency signal is attenuated 29 db. The minimum input detectable level is minus 114 dbm. for a receiver with 1.5 mc. IF, 6250 c.p.s. video bandwidth and 25 percent modulation by 30 c.p.s. signal.

While a preferred form the invention has been shown and described for the purposes of illustration, it will be understood that reasonable modifications may be made in the practice of the invention without departing from the spirit of the invention or the scope of the following claims. For instance, when additional dynamic range is desired a four or five-port microwave circulator may be used with proper termination. Also, the required degree of termination may be realized by using three-port microwave circulators in cascade.

I claim:

1. A continuous microwave attenuator for extending the dynamic range of microwave receivers with little degradation of said receivers minimum detectable signal level or noise figure comprising, a microwave circulator provided with at least a first, second and third coupling means, said second coupling means being positioned therein intermediate said first and third coupling means, antenna means coupled to said first coupling means, radio frequency receiving means having incorporated therein signal level responsive circuit means including an electromagnetic relay provided with two normally opened contacts, a common circuit, said radio frequency receiving means connected to said common circuit with its input coupled to said third coupling means, a termination load means having one terminal connected to said common circuit and another terminal connected to one of said contacts, the other of said contacts coupled to said second coupling means, said signal level response circuit means operative in response to a signal above predetermined level to energize said relay whereby said two normally opened contacts close to couple said termination load means to said first coupling means whereby a sufficient amount of radio frequency energy of said signal is absorbed preventing saturation of said receiving means.

2. A continuous microwave attenuator for extending the dynamic range of microwave receivers with little degradation of said receivers minimum detectable signal or noise figure comprising in combination, a microwave circulator provided with symmetrically disposed first, second and third coupling means, said second coupling means positioned intermediate said first and third coupling means, antenna means coupled to said first coupling means, microwave receiver means comprising a receiver and a preamplifier coupled thereto, the input of said preamplifier coupled to said third coupling means, said receiver having incorporated therein an automatic gain control circuit, an electromagnetic relay provided with two normally opened contacts wire into said automatic gain control circuit, a common circuit, said receiver means grounded to said common circuit, a termination load means consisting of a resistor having one terminal thereof connected to said common circuit, another terminal of said resistor connected to one of said contacts, said second coupling means coupled to the other of said contacts, said automatic gain control circuit energizing said relay in response to a signal level that causes saturation of said preamplifier whereby said normally opened contacts are closed connecting said resistor to said second coupling means whereby most of the radio frequency energy of said signal is absorbed by said resistor with the remaining attenuated signal going into said third coupling means and thus to said preamplifier.

References Cited

UNITED STATES PATENTS 3,108,236 10/1963 Medina.

KATHLEEN H. CLAFFY, *Primary Examiner.*

B. P. SMITH, *Assistant Examiner.*

U.S. Cl. X.R.

333—24.2, 81; 325—425, 400